United States Patent
Demkowicz

(10) Patent No.: US 11,044,302 B2
(45) Date of Patent: Jun. 22, 2021

(54) PROGRAMMING INTERFACE AND METHOD FOR MANAGING TIME SHARING OPTION ADDRESS SPACE ON A REMOTE SYSTEM

(71) Applicant: International Business Machines Corporation, Armonk, NY (US)

(72) Inventor: Susan Z. Demkowicz, Rhinebeck, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 687 days.

(21) Appl. No.: 15/279,608

(22) Filed: Sep. 29, 2016

(65) Prior Publication Data

US 2018/0091380 A1 Mar. 29, 2018

(51) Int. Cl.
*H04L 29/08* (2006.01)
*G06F 15/167* (2006.01)
*G06F 9/54* (2006.01)

(52) U.S. Cl.
CPC .............. *H04L 67/10* (2013.01); *G06F 9/544* (2013.01); *G06F 15/167* (2013.01)

(58) Field of Classification Search
CPC ............. H04L 41/0873; H04L 41/0869; H04L 41/0823; H04L 41/082; H04L 41/08; H04L 41/084; H04L 41/0826; H04L 41/02; H04L 41/085; G06F 16/10; G06F 16/20
USPC ......................................................... 709/220
See application file for complete search history.

(56) References Cited

U.S. PATENT DOCUMENTS

| | | | |
|---|---|---|---|
| 7,870,557 B2* | 1/2011 | Fontaine | G06F 8/63 719/312 |
| 8,966,595 B1* | 2/2015 | Amacker | H04L 63/04 715/733 |
| 2002/0002677 A1* | 1/2002 | Eade | G06F 21/629 713/164 |
| 2008/0307429 A1* | 12/2008 | Fontaine | G06F 8/63 719/312 |
| 2009/0049153 A1* | 2/2009 | McFadden | G06F 16/10 709/217 |
| 2012/0254889 A1* | 10/2012 | Demkowicz | G06F 9/468 718/107 |
| 2014/0258256 A1* | 9/2014 | Dee | G06F 9/547 707/705 |
| 2019/0306164 A1* | 10/2019 | Brands | H04L 9/3228 |

FOREIGN PATENT DOCUMENTS

GB 1452865 10/1976

* cited by examiner

*Primary Examiner* — Mahran Y Abu Roumi
(74) *Attorney, Agent, or Firm* — Cantor Colburn LLP; William Kinnaman

(57) ABSTRACT

Aspects of the present invention include a method, system and computer program product for managing time sharing option address space on one computer system for a software program running on another computer system. The method includes a processor creating a time sharing option address space on a first computer, the time sharing option address space on a first computer configured to store data; running a computer program on a second computer; and managing data within the time sharing option address space with respect to the computer program running on a second computer.

17 Claims, 7 Drawing Sheets

PROGRAMMING INTERFACE AND METHOD FOR MANAGING TIME SHARING OPTION ADDRESS SPACE ON A REMOTE SYSTEM

BACKGROUND

The present invention relates to mainframe computing systems, and more specifically, to a method, system and computer program product that allows a software program running on one mainframe computing system to manage a time sharing option address space located on another, "remote" mainframe computing system.

In the field of mainframe computers or computing systems, it is common to connect or cluster together a plurality of such mainframe computing systems in what is typically known as a parallel systems complex or "sysplex." As such, the sysplex cluster of mainframes act together as a single image in conjunction with the software operating system. The sysplex configuration provides for parallel computing and data and computing resource sharing by multiple users to thereby improve overall workload processing.

In this type of sysplex mainframe computer configuration, it is generally only possible to access, store and retrieve data (i.e., "manage" data) from a time sharing option (TSO) address space that has been created on the same mainframe computing system on which a particular software program is running. This prevents a cloud-based computing approach to TSO data sessions.

SUMMARY

According to one or more embodiments of the present invention, a computer-implemented method includes creating, by a processor, a time sharing option address space on a first computer, the time sharing option address space on a first computer configured to store data; running, by the processor, a computer program on a second computer; and managing, by the processor, data within the time sharing option address space with respect to the computer program running on a second computer.

According to another embodiment of the present invention, a system includes one or more processors in communication with one or more types of memory, the one or more processors configured to create a time sharing option address space on a first computer, the time sharing option address space on a first computer configured to store data; to run a computer program on a second computer; and to manage data within the time sharing option address space with respect to the computer program running on a second computer.

According to yet another embodiment of the present invention, a computer program product includes a non-transitory storage medium readable by a processing circuit and storing instructions for execution by the processing circuit for performing a method that includes creating a time sharing option address space on a first computer, the time sharing option address space on a first computer configured to store data; running a computer program on a second computer; and managing data within the time sharing option address space with respect to the computer program running on a second computer.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
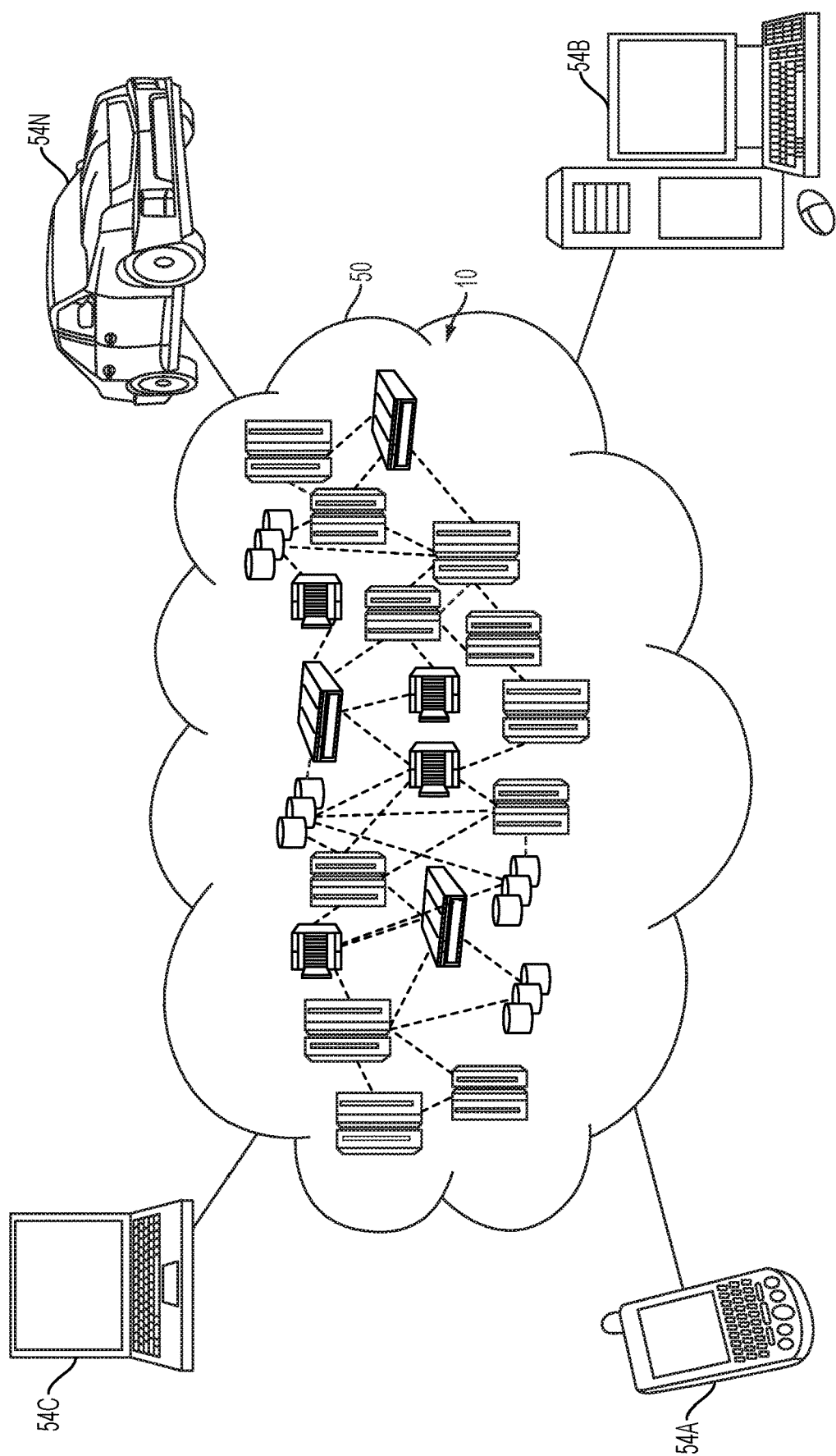
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
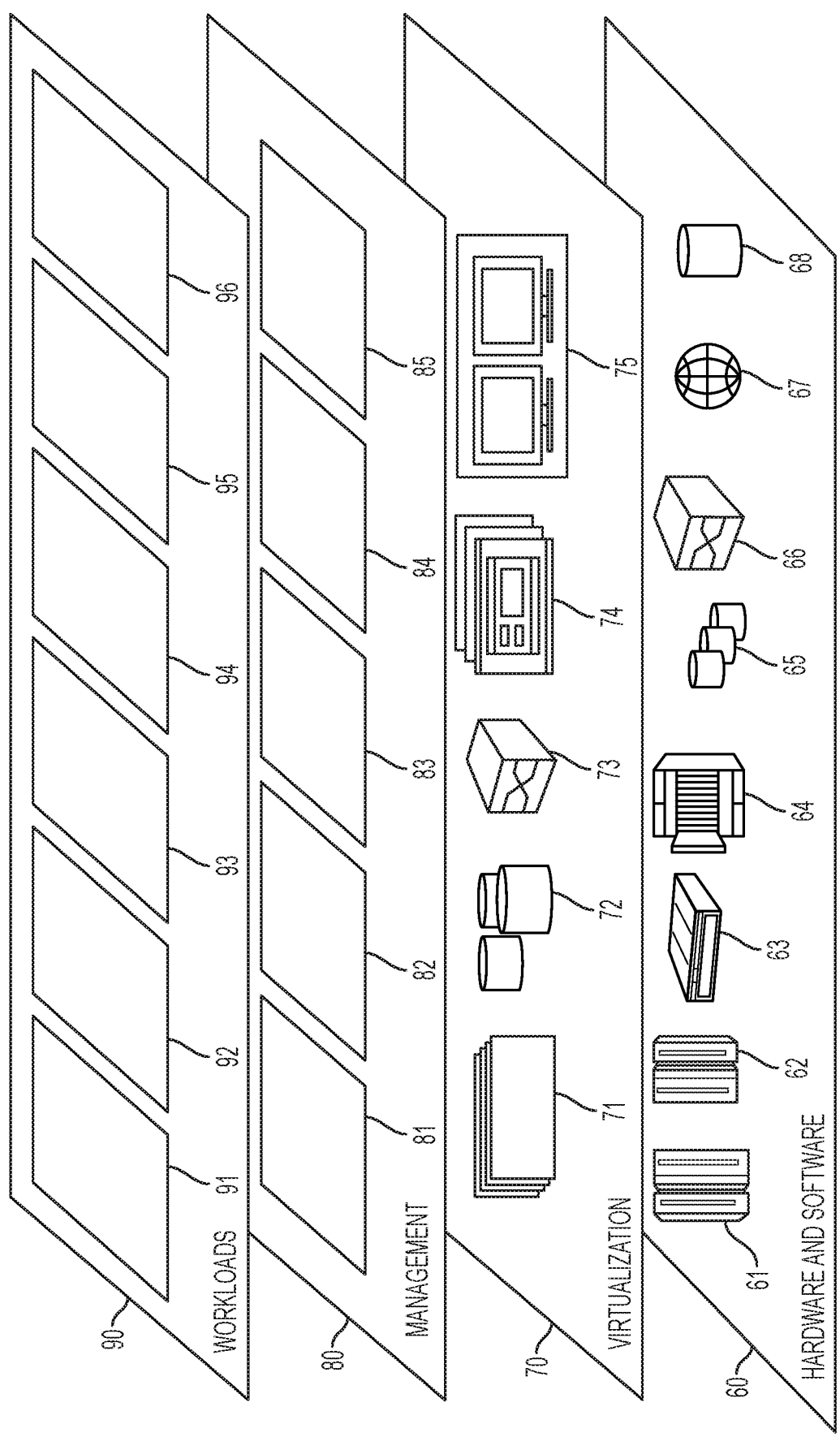
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for managing time sharing option address space on one computer system for a software program running on another computer system in accordance with one or more embodiments of the present invention.

In accordance with one or more embodiments of the present invention, methods, systems, and computer program products are disclosed for managing time sharing option address space on one computer system within a cloud or other multiple computer configuration for a software program running on another computer system within the cloud or other multiple computer configuration.

Embodiments of the present invention allow for a time sharing option (TSO) address space to be created and accessed (i.e., "managed") on a mainframe computer or computing system (i.e., a remote system) that is different from the mainframe computer or computing system on which a particular software platform or program is running (i.e., an originating system). That is, the originating computing system running a software program can access the TSO address space that was created on the different or "remote" computing system. This allows an originating system to access, store, retrieve, etc., data that is accessible through the TSO address space which is on the remote system.

In existing mainframe computing systems having multiple mainframe computers or computing systems (e.g., a cloud or a sysplex system), it is only possible to create and perform a TSO "session" on the same mainframe computer on which a particular software program is running that wants to access a TSO address space. A TSO session, in general, is one in which a user of a mainframe computer or computing system can interact with data that is stored on that mainframe computer or computing system. Such a session is typically created and performed through user interaction with the operating system. With TSO, multiple users can interact with the operating system to perform tasks such as storing, modifying, accessing and retrieving (i.e., "managing") the data resident on that system.

This restriction in existing mainframe computer or computing systems does not allow for a cloud-based approach to TSO sessions. In such an existing mainframe computer system configuration, the originating system or "caller" is forced to perform the TSO session on the same mainframe computer or computing system that the caller is running its desired software program on. As such, a program cannot be run on one computer within the sysplex or cloud while the TSO session is being run on another computer within the sysplex or cloud. Instead, the TSO and the caller both have to be on the same mainframe computer within the sysplex or cloud.

Embodiments of the present invention essentially create an underlying infrastructure (e.g., a programming interface) that allows a software platform or program (e.g., an operating system) to select which one of multiple computers or computing systems within a cloud or sysplex to create a TSO address space on. The infrastructure is able to transport data to and from (or between) a "remote" computer with the TSO address space created on it and an "originating" computer (e.g., "caller") running a software program that wants to manage data in the TSO address space.

In accordance with embodiments of the present invention, an aspect of the data transport mechanism is the creation of two message queues—one on the originating system and another on the remote system. These queues, together with the intrasystem communication processing functionality, allows the TSO address space to be created on any of the computers or computing systems within the same cloud or same sysplex configuration and also to be accessed by any other one or more of the other computers and computing systems (or even the same computer or computing system with the TSO address space on it) in the cloud or sysplex. That is, embodiments of the present invention are constrained to use with all of the computers within a single sysplex or single cloud configuration. In other words, any particular embodiment is not for use on more than one sysplex or cloud configuration. The caller computer and the remote computer must be on the same sysplex or cloud configuration—you cannot have a caller located on a computer located within a first sysplex or cloud configuration and have the remote computer with the TSO address space located on another computer located within a second, different sysplex or cloud configuration (i.e., no cross-sysplex or cross-cloud communication).

Figure 3:
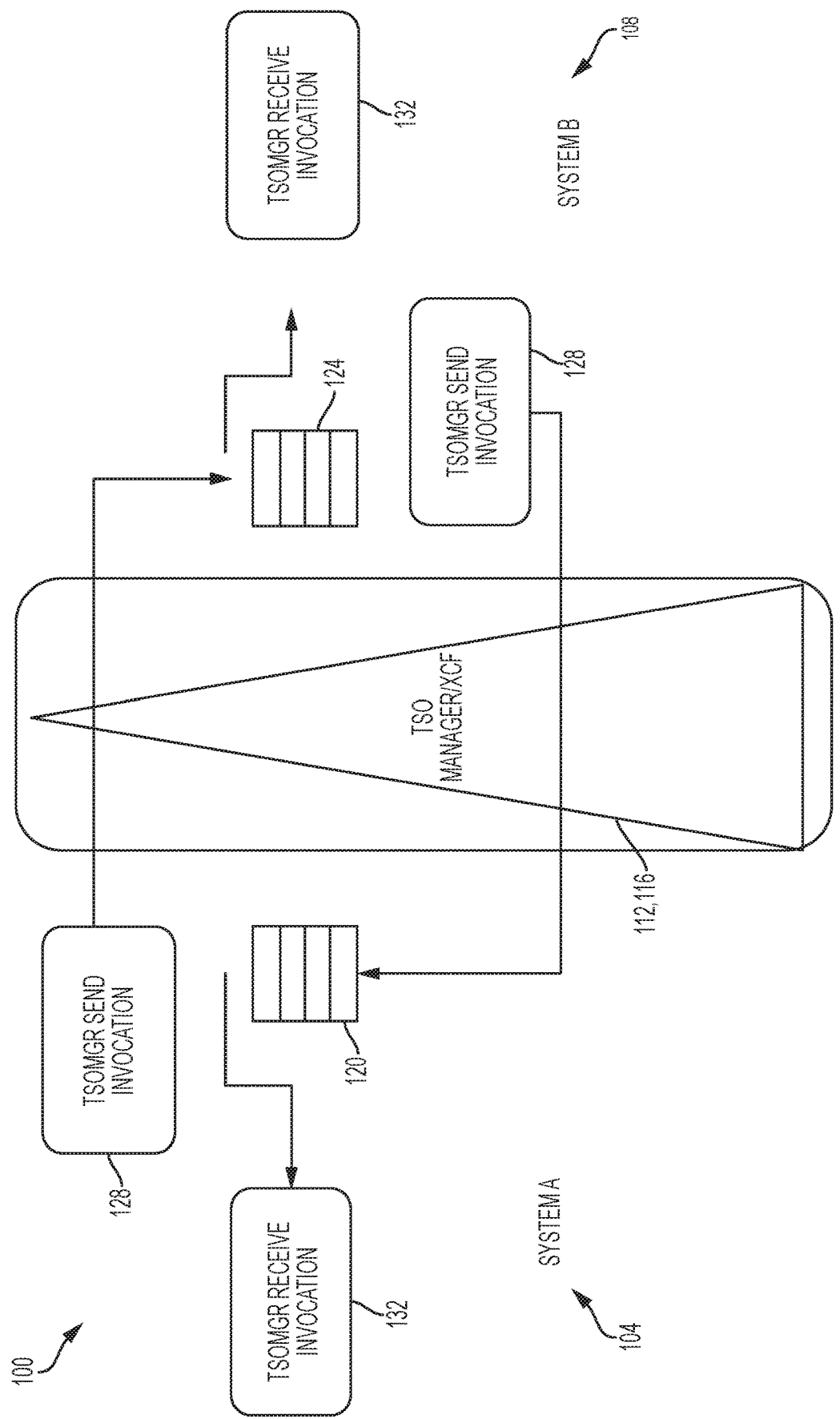
FIG. 3 is a block diagram of at least two mainframe computers or computing systems in which a time sharing option address space is created on one computing system and a program running on the other computing system can access the time sharing option address space, in accordance with one or more embodiments of the present invention.

Referring now to FIG. 3, there illustrated is a block diagram of an exemplary embodiment of the present invention. Shown there is a parallel connection (e.g., a systems complex or "sysplex" 100) of at least two mainframe computers or computing systems 104, 108 (e.g., System A 104 and System B 108). In the alternative, the at least two mainframe computers or computing systems 104, 108 (or the sysplex 100 itself) may be embodied in the cloud computing environment 50 described hereinabove and illustrated in FIGS. 1 and 2. Further, the computers or computing systems 104, 108 do not need to be mainframe computers or computing systems. Other types of computers or computing systems besides mainframes are contemplated by embodiments of the present invention.

One or more embodiments of the present invention may be described herein in conjunction with a specific software platform or program, for example, the IBM System z z/OS operating system. Thus, some of the terms used herein are specific to that particular IBM operating system. However, it is to be understood that various other embodiments of the present invention may be described for use with other specific software platforms, including other operating systems, or other computer programs besides operating systems.

In embodiments of the present invention, a user, client or "caller" running a software program on one mainframe computer 104 in the sysplex 100 may logon to or access a TSO address space on another mainframe computer 108 in the same sysplex 100. This will allow cloud-based exploiters of the TSO address space manager (TSOASMGR) to execute on another, "remote" computer 104, 108 in the sysplex 100. In embodiments, the Common Event Adapter (CEA) TSO/E address space manager 112 (hereinafter "TSO Manager," "TSOASMGR," or "TSOMGR") may provide the infrastructure code for managing the associated TSO sessions between the computers 104, 108 in the sysplex 100. Also, the TSOASMGR may use the cross system coupling facility (XCF) services 116 to allow for communications between the caller and the remote TSO address space. The XCF services 116 are a common component of a sysplex and they allow for peer-to-peer communications between the mainframe computers 104, 108 in the sysplex 100.

In embodiments of the present invention, a TSO remote session may be established for the user, client or caller by creating two queues 120, 124, one queue on each mainframe computer system 104, 108. These queues 120, 124 may be read by the caller and the TSO, respectively. Data (e.g., messages) may be moved through the queues 120, 124 by using dedicated send and receive application program interface (API) functions that perform the data transport from one system 104, 108 to the other system 104, 108. These send and receive message communication transport functions may comprise "TSOMGR send invocation" 128 and "TSOMGR receive invocation" 132, respectively. In general, in embodiments of the present invention (and as seen in FIG. 3), data may be sent to a queue 120 on system 104, or to a queue 124 located in a remote system 108 which embodies the TSO address space, while the data may be read from a queue 120 on local system 104 which embodies the user, client or caller.

In other embodiments of the present invention, the TSO address space may be located on the same computer 104, 108 as the caller. In these embodiments, only one queue 120, 124 need be created (i.e., on the single computer 104, 108 that has both the TSO address space and the caller running a computer program which desires to access the TSO address space).

The XCF services 116 may be used to transport the messages between the TSO and the client computers 104, 108 to facilitate data communication. In accordance with embodiments of the present invention, the TSO and the client are on separate computers 104, 108 in the sysplex 100. (However, as mentioned, in other embodiments the TSO and the client or caller can be on the same computer.) To achieve proper message transport, the TSO Manager 112 may establish XCF servers in its address space on every computer 104, 108 in the sysplex 100. With the construction of the XCF servers, a message queue on the remote system may also be constructed for each remote session requested. In effect, for each session established there will be two message queues 120, 124 associated with it. One queue will be used to receive messages and the other queue will be used to send messages. For the caller and for the TSO, the receive queue will be the queue on the system they reside, and the send queue will be on the remote system.

The TSO message send operation 128 may be performed by the TSO Manager 112 recognizing that the message is to be sent to a remote system 104, 108 in the sysplex 100. As such, the local TSO Manager 112 engages the remote TSO Manager 112 via the XCF 116 to actually put the message on the remote queue 120, 124. To process a TSO message receive request locate the queue 120 on system 104, and retrieve the message from that queue on behalf of the caller. Internally, the TSO message receive operation 132 may use the Unix send and 132, the TSO Manager 112 is able to locate the queue 124 on system 108, to receive queue operations.

Besides a start session request (TSOStart), other TSORequest functions may also be extended to support remote TSO processing in accordance with embodiments of the present invention. These other functions include: TSOEnd; TSOQuery; TSOAttn; TSOPing; and TSOQueryApp.

As the TSO Manager 112 is now managing the placement of data in the queues 120, 124 on behalf of the callers, application program interface (API) support is needed to allow the user to easily flow data to the remote TSO session. This is because the callers are no longer in a position to do this themselves. In embodiments of the present invention, the 64-bit APIs are the TSO message send and the TSO message receive operations. Additionally, the TSO, which can manipulate queue data directly, also needs a set of wrappers to perform this function. These TSO callable services are the TSOMGR send invocation and the TSOMGR receive invocation. Queues continue to be used as the protocol for handling the messages as the protocol is tied to message type.

In accordance with embodiments of the present invention, details of a remote session "Start" are as follows: The caller, System A 104 (FIG. 3), requests the TSO Manager to start the remote TSO session using TSOStart. The TSO Manager 112 for System A 104 then creates a local Unix queue, packages the caller's parameters, captures the security context of the caller, and invokes the send operation.

Also, the TSO Manager 112 for System B 108 (FIG. 3) changes the security context to that of the caller's, creates a 'remote' Unix queue, creates a session table entry with both the local and remote Unix queue IDs, creates the connection handle for TSO, and creates the address space with existing system services.

At the same time, the TSO Manager on System B 108 (FIG. 3) retrieves a connection handle for this TSO session. System A 104 then updates the session table with the 'remote' queue ID, creates a connection handle for the caller, and then returns to the caller. System B 108 then calls TSO processing, which invokes the TSOASMGR send operation to place data into the queue 120 on system A 104 for the caller to receive. Finally, System A 104 issues the TSOMGR message receive command to retrieve data sent by the newly created TSO session.

Figure 4A:
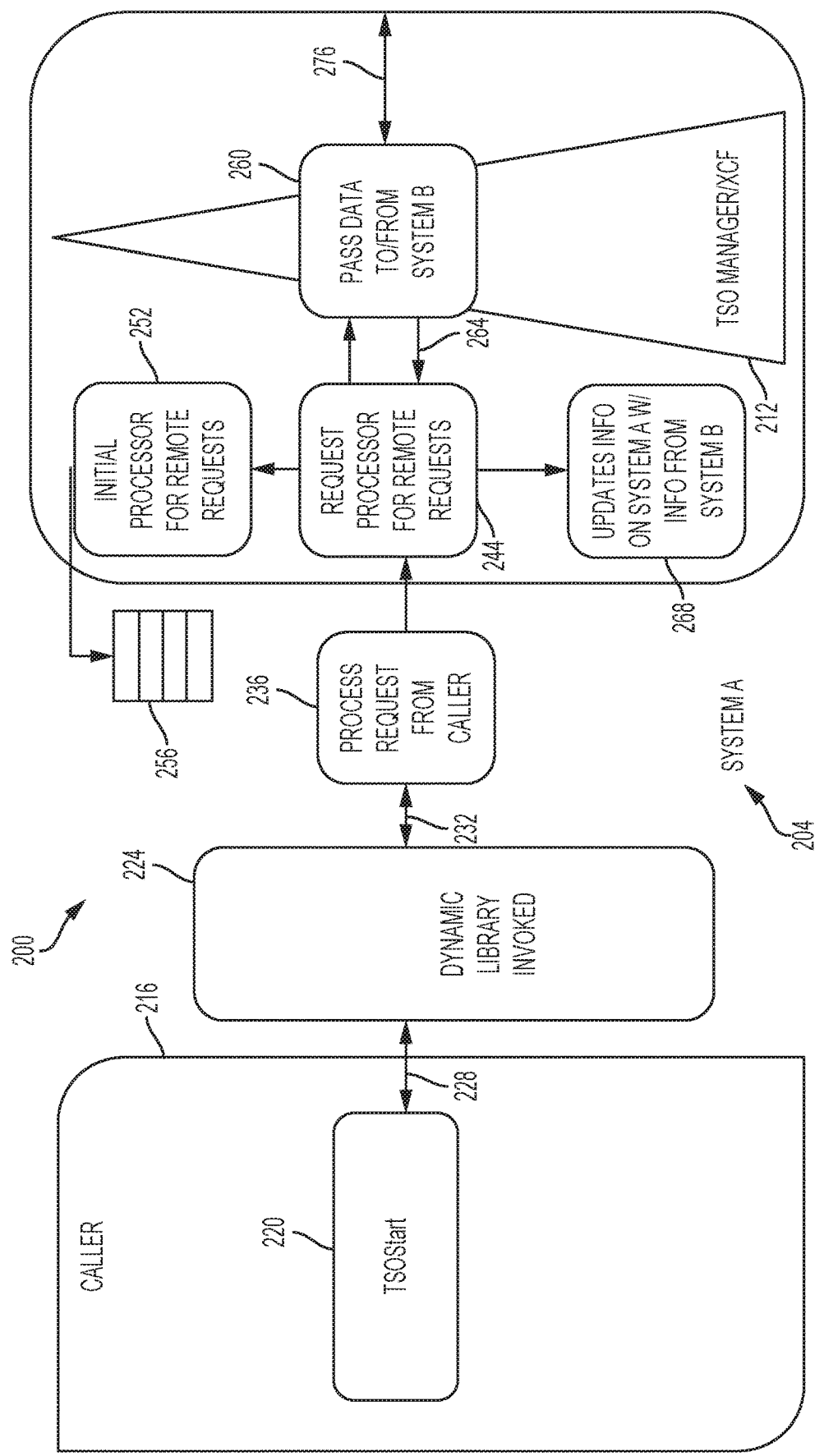
FIGS. 4A and 4B illustrate a flow diagram of a method for handling a request from one of the mainframe computing systems of FIG. 3 for creating a TSO address space on another one of the mainframe computing systems of FIG. 3 in accordance with one or more embodiments of the present invention.
Figure 4B:
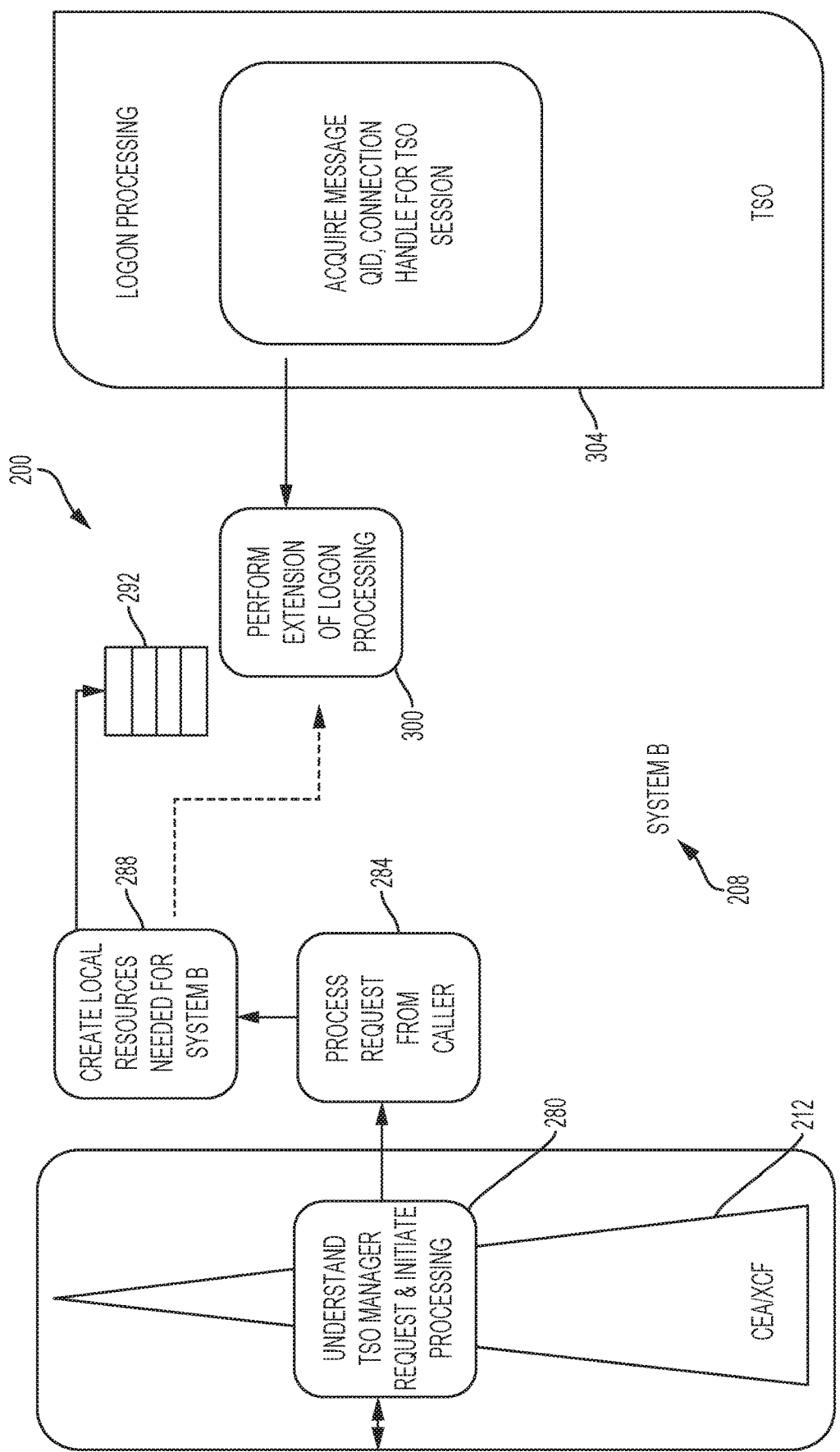

Referring now to FIGS. 4A and 4B, there illustrated is a flow diagram of a method 200 according to embodiments of the present invention for handling a request (TSOStart) from one of the computer systems 204 ("System A") in the sysplex 100 for creating a TSO address space on another, "remote" computer system 208 ("System B") in the sysplex 100. FIGS. 4A and 4B logically overlap at the TSO Manager's address space 212 in each of FIGS. 4A and 4B.

The caller's address space is designated 216 in FIG. 4A and may reside, for example, within the IBM System z z/OS operating system. The request to create the TSO address space comes from this caller. In an operation in block 220, the TSO Manager is used to request the creation of a TSO address space (TSOStart) on the remote computer system 208 (System B). This interface has been adjusted to include the name of the target system 208 to create the new address space.

The dynamic library that is invoked when the request is made is designated 224 in FIG. 4A. In an operation in block 228, a call is made to the various TSO Manager's APIs which represents the dynamic link that is performed when that call is made. The dynamic library code knows which computer routine to invoke for which API. This is designated 232 in FIG. 4A.

In an operation in block 236, the request from the caller is processed. When it is recognized that the request is an address space on a remote system, a request processor starts the processing in an operation in block 244. The request processor may perform the processing in logical chunks.

In an operation in block 252, the initial processor for remote requests requests creation of the local queue 256, and updates the session table. The initial processor sets up the local resources that are needed. All of the information about the remote session is typically not known at this point in time; thus, a partial session table entry is created.

In an operation in block 260, the data is passed across to the TSO Manager on System B 208. Also, in this operation in block 260 data may be received from the remote system (System B 208) and passed to the request processor 244 in an operation in block 264. In an operation in block 268, the information on system A 204 is updated with the information from System B 208.

In an operation in block 276, a request is placed by the TSO Manager on System A 204 to the underlying message transportation services. As seen in FIG. 4B, an operation in block 280 runs on the system (i.e., System B 208) that is the target of the request and this operation understands each type of TSO Manager to TSO Manager request and initiates processing on the system.

In an operation in block 284, the request from the caller is processed. This time the caller is the TSO Manager 212 on behalf of the caller on System A 204. This operation 284 understands that if the caller is the TSO Manager 212, the security context has to be adjusted to that of the real caller on System A 204.

In an operation in block 288, the local resources needed for the session used on System B 208 are created. This operation in block 288 will create another queue 292 for this session that will reside on System B 208. Both Systems A and B 204, 208 now have a queue 256, 292 for use.

In an operation in block 300, an extension of logon processing is performed. This operation will access the appropriate session table entry and return the queue ID and connection handle to the TSO. The TSO code will store these values into its LWA. The TSO session is designated 304. Logon processing continues with the newly acquired message qid and the connection handle for the TSO session.

Figure 5A:
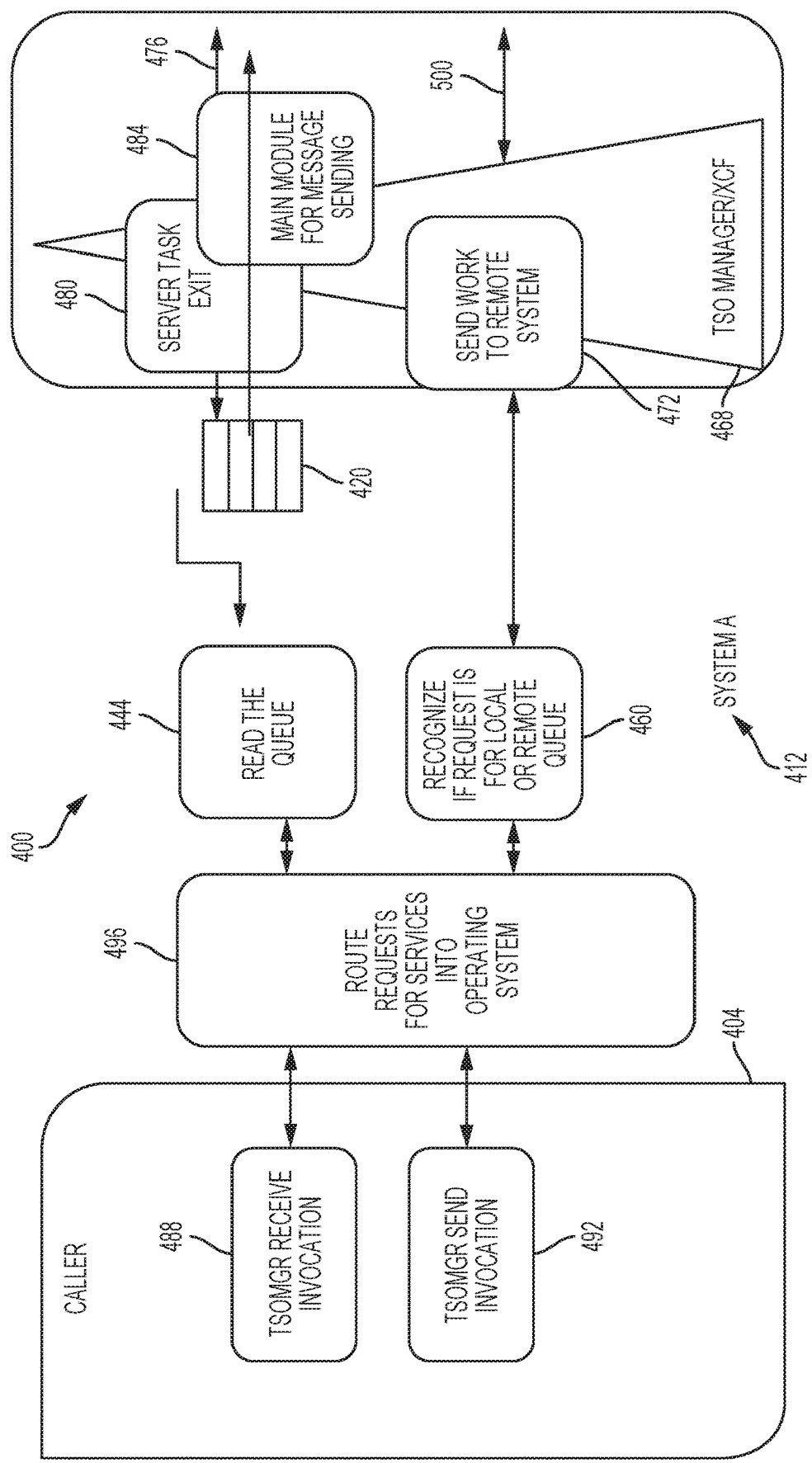
FIGS. 5A and 5B illustrate a flow diagram of a method for sending and receiving messages between two of the mainframe computing systems of FIG. 3 in accordance with one or more embodiments of the present invention.
Figure 5B:
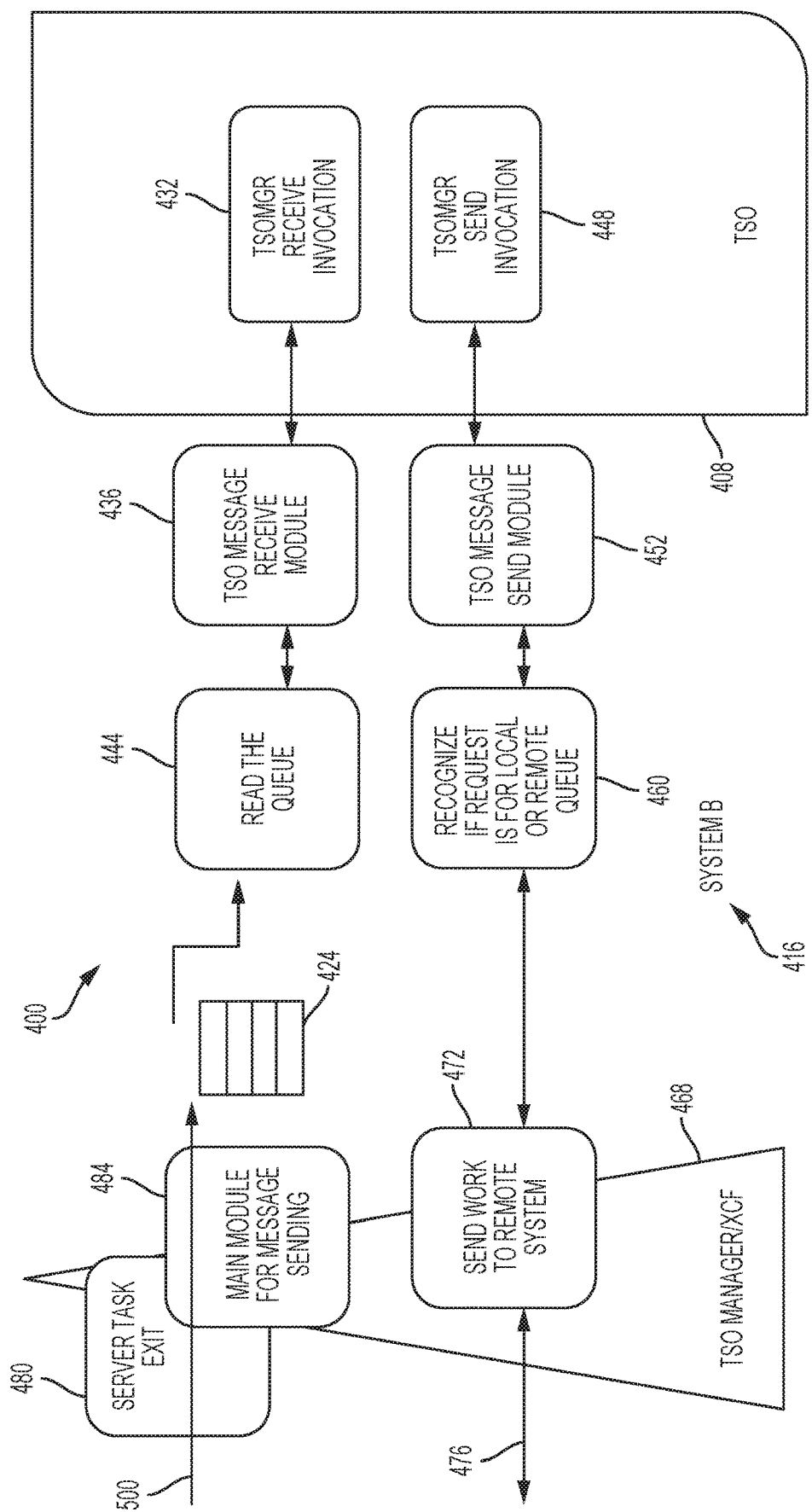

Referring now to FIGS. 5A and 5B, there illustrated is a flow diagram of a method 400 according to embodiments of the present invention for sending and receiving a message from a Unix message queue. These figures show a flow of a TSO Address Space Manager (TSOASMGR) caller 404 and a TSO 408. Note that each of FIGS. 5A and 5B represents processing on a different mainframe computer system (System A 412 and System B 416). The software executing are the same on both systems 412, 416. For completeness, FIGS. 5A and 5B show an end-to-end flow. In this discussion, the TSOASMGR has already created the TSO address space on System B 416. The caller 404 and the TSO 408 both have the connection handle and are able to start using the message queues. Each session has two queues 420, 424; one queue on each system 412, 416.

The TSO read/write module is identified as 408 in FIG. 5A and comprises the primary module that sends data to and receives data from the message queues. The TSO code uses this new support to communicate with a TSO caller on another system.

In an operation in block 432, there indicated is the entry point that the TSO 408 uses to call the TSOMGR receive invocation. The TSO 408 does not operate in the LE environment, nor is it a 64 bit caller. The TSOMGR receive invocation allows the TSO 408 to adjust for this.

In an operation in block 436, the TSO message receive module supports the TSO Manager and is used by the TSO 408 to perform data parameter adjustments An operation in block 444 asks to read the queue 424 as requested. The queue 424 receives messages sent from System A 412. System B 416 retrieves messages from this queue 424. This queue 424 is in the security identity of the owner of the TSO Address space.

As part of the TSO 408, the TSOMGR send invocation implements the message send function. The TSO 408 does not operate in the UNIX environment, nor is it a 64 bit caller. This 'wrapper' 448 was written for the TSO 408 to adjust for this.

In an operation in block 452, the TSO message send module is for use by the TSO 408 and performs data parameter adjustments. An operation in block 460 recognizes if this request is for a local or remote queue. If the queue is on a remote system, it will send the request forward.

An operation in block 472 sends work to a remote system (not shown). The line 476 designates the transition of the request through the TSO Manager over to the intended system (System A 412).

An operation in block 480 comprises the XCF server task exit which runs in the TSO Manager's address space. The server identifies the request as a send and starts an operation in block 484 which is the main module for message sending.

The queue 420 on System A 412 has the security identity as the owner of the TSO address space. The caller 404 is the address space that is using the TSO address space that was created.

The TSO Manager receive invocation is designated 488 in FIG. 5A, while the TSO Manager send invocation is designated 492 in FIG. 5A.

In an operation in block 496, requests for services of the TSO Address Space Manager are routed into the operating system.

The designation 500 depicts the transition of the request through the TSO Manager over to the intended System A 412 or System B 416 using the cross system message communication services 468.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
creating, by a processor of a first computer, a time sharing option address space on a different second computer remotely located from the first computer, the time sharing option address space on the second computer configured to store data, wherein the creating is performed in response to a start command executed by the processor of the first computer wherein the start command identifies the second computer;
running, by the processor of the first computer, a computer program on the first computer; and
managing, by the processor of the first computer, data within the time sharing option address space with respect to the computer program running on the first computer,
wherein creating the time sharing option address space comprises creating a first queue on the first computer and a second queue on the second computer, the first and second queues configured to transport data therebetween using dedicated send and receive application program interface (API) functions,
wherein the execution of the start command causes the processor of the first computer to create the first queue, package parameters of the first computer, capture a security context of the first computer and invoke a send operation and causes the processor of the second computer to create the second queue, change a security context of the second computer to match the security context of the first computer, create a session table entry with queue identifications associated with the first queue and the second queue, and create a connection handle for the time sharing option address.

2. The computer-implemented method of claim 1 wherein the first and second computers each comprise a mainframe computer.

3. The computer-implemented method of claim 1 wherein the first and second computers each comprise a mainframe computer that is located within a cloud computing environment.

4. The computer-implemented method of claim 1 wherein the first and second computers each comprise a mainframe computer that is located within a sysplex computing environment.

5. The computer-implemented method of claim 1 wherein the computer program comprises an operating system.

6. The computer-implemented method of claim 1 wherein managing, by the processor of the first computer, data within the time sharing option address space with respect to the computer program running on the first computer further comprises the processor storing, accessing and retrieving data within the time sharing option address space.

7. A system comprising:
one or more processors in communication with one or more types of memory, the one or more processors configured to:
create, by a first computer, a time sharing option address space on a different second computer remotely located from the first computer, the time sharing option address space on the second computer configured to store data, wherein the creating is performed in response to a start command executed by the processor of the first computer wherein the start command identifies the second computer;
run a computer program on the first computer; and
manage data within the time sharing option address space with respect to the computer program being run on the first computer,
wherein creating the time sharing option address space comprises creating a first queue on the first computer and a second queue on the second computer, the first and second queues configured to transport data therebetween using dedicated send and receive application program interface (API) functions,
wherein the execution of the start command causes the processor of the first computer to create the first queue, package parameters of the first computer, capture a security context of the first computer and invoke a send operation and causes the processor of the second computer to create the second queue, change a security context of the second computer to match the security context of the first computer, create a session table entry with queue identifications associated with the first queue and the second queue, and create a connection handle for the time sharing option address.

8. The system of claim 7 wherein the first and second computers each comprise a mainframe computer.

9. The system of claim 7 wherein the first and second computers each comprise a mainframe computer that is located within a cloud computing environment.

10. The system of claim 7 wherein the first and second computers each comprise a mainframe computer that is located within a sysplex computing environment.

11. The system of claim 7 wherein the computer program comprises an operating system.

12. The system of claim 7 wherein the one or more processors are further configured to store data within the time sharing option address space, to access data within the time sharing option address space, and to retrieve data within the time sharing option address space.

13. A computer program product comprising:
a non-transitory storage medium readable by a processing circuit and storing instructions for execution by the processing circuit for performing a method comprising:
creating, by a first computer, a time sharing option address space on a different second computer remotely located from the first computer, the time sharing option address space on the second computer configured to store data, wherein the creating is performed in response to a start command executed by the processor of a first computer wherein the start command identifies the second computer;
running a computer program on the first computer; and
managing data within the time sharing option address space with respect to the computer program running on the second computer,
wherein creating the time sharing option address space comprises creating a first queue on the first computer and a second queue on the second computer, the first and second queues configured to transport data therebetween using dedicated send and receive application program interface (API) functions,
wherein the execution of the start command causes the processor of the first computer to create the first queue, package parameters of the first computer, capture a security context of the first computer and invoke a send operation and causes the processor of the second computer to create the second queue, change a security context of the second computer to match the security context of the first computer, create a session table entry with queue identifications associated with the first queue and the second queue, and create a connection handle for the time sharing option address.

14. The computer program product of claim 13 wherein the first and second computers each comprise a mainframe computer.

15. The computer program product of claim 13 wherein the first and second computers each comprise a mainframe computer that is located within a cloud computing environment.

16. The computer program product of claim 13 wherein the first and second computers each comprise a mainframe computer that is located within a sysplex computing environment.

17. The computer program product of claim 13 wherein the computer program comprises an operating system.

* * * * *